(12) United States Patent
Wang et al.

(10) Patent No.: US 11,326,325 B2
(45) Date of Patent: May 10, 2022

(54) REGIONAL RAINWATER ALLOCATION METHOD

(71) Applicant: Nanjing Hydraulic Research INST., State Key Lab of Hydrology-Water Resources & Hydraulic Engineering, Nanjing (CN)

(72) Inventors: Xiaojun Wang, Nanjing (CN); Jianyun Zhang, Nanjing (CN); Feng Chen, Nanjing (CN); Qin Huang, Nanjing (CN); Xiaoqing Tian, Nanjing (CN)

(73) Assignee: NANJING HYDRAULIC RESEARCH INST., STATE KEY LAB OF HYDROLOGY-WATER RESOURCES & HYDRAULIC ENGINEERING, Nanjing (CN)

( * ) Notice: Subject to any disclaimer, the term of this patent is extended or adjusted under 35 U.S.C. 154(b) by 49 days.

(21) Appl. No.: 16/959,428

(22) PCT Filed: Dec. 13, 2018

(86) PCT No.: PCT/CN2018/120937
§ 371 (c)(1),
(2) Date: Jun. 30, 2020

(87) PCT Pub. No.: WO2019/137149
PCT Pub. Date: Jul. 18, 2019

(65) Prior Publication Data
US 2020/0370283 A1 Nov. 26, 2020

(30) Foreign Application Priority Data

Jan. 15, 2018 (CN) .......................... 201810037166.9

(51) Int. Cl.
*E03B 3/02* (2006.01)
*C02F 1/00* (2006.01)
(Continued)

(52) U.S. Cl.
CPC ................ *E03B 3/02* (2013.01); *C02F 1/004* (2013.01); *E03B 5/00* (2013.01); *E03B 11/14* (2013.01);
(Continued)

(58) Field of Classification Search
CPC ..... E03F 1/00; E03F 1/002; E03F 5/10; E03F 5/101; E03F 5/14; E03F 5/22;
(Continued)

(56) References Cited

U.S. PATENT DOCUMENTS 4,971,690 A 11/1990 Justice
5,342,144 A * 8/1994 McCarthy ................ E03F 1/00
405/36
(Continued)

FOREIGN PATENT DOCUMENTS

CN 1594142 A 3/2005
CN 102080647 A 6/2011
(Continued)

OTHER PUBLICATIONS

Machine translation of CN 1594142, Mar. 2005 (Year: 2005).*
Machine translation of CN 106812145 Jun. 2017 (Year: 2017).*

*Primary Examiner* — Christopher Upton
(74) *Attorney, Agent, or Firm* — Bayramoglu Law Offices LLC

(57) ABSTRACT

An engineering system for collecting and utilizing regional rainwater includes a rainwater collection system, a water quality treatment system, and a control and allocation system. The rainwater collection system includes a rainwater collection ditch for a hardened underlying surface, a barrier and a water storage tank. The water quality treatment system includes a filter system. The control and allocation system includes a water quality monitoring device, a water level monitor, a control gate and a water pump. The filter system (Continued)

is connected to the underlying surface through the rainwater collection ditch, and the filter system is connected to the water storage tank. The control gate is disposed between the filter system and the water storage tank. The water quality monitoring device and the water level monitor are disposed within the water storage tank. The water pump is used to drain water from the water storage tank.

5 Claims, 2 Drawing Sheets

(51) Int. Cl.
*E03B 5/00* (2006.01)
*E03B 11/14* (2006.01)
*E03F 1/00* (2006.01)
*G01W 1/00* (2006.01)
*C02F 103/00* (2006.01)

(52) U.S. Cl.
CPC ............... *E03F 1/00* (2013.01); *G01W 1/00* (2013.01); *C02F 2103/001* (2013.01); *C02F 2209/42* (2013.01); *E03F 2201/00* (2013.01)

(58) Field of Classification Search
CPC .......... E03F 2201/00; E03B 3/02; E03B 5/00; E03B 11/14; G01W 1/00

USPC ..... 210/170.03, 747.2, 747.3; 405/36; 702/3
See application file for complete search history.

(56) References Cited

U.S. PATENT DOCUMENTS

| | | | | |
|---|---|---|---|---|
| 6,818,127 | B1* | 11/2004 | Ketrow | E03B 3/02 210/170.03 |
| 7,136,756 | B1* | 11/2006 | Vieux | G06T 17/05 702/3 |
| 2004/0108278 | A1* | 6/2004 | Hosoya | C02F 1/725 210/747.3 |
| 2011/0120561 | A1* | 5/2011 | Quigley | E03F 1/00 137/1 |
| 2014/0352729 | A1* | 12/2014 | Happel | E03F 5/101 405/36 |
| 2015/0021247 | A1* | 1/2015 | Lin-Hendel | E03B 3/03 210/170.03 |
| 2015/0078826 | A1* | 3/2015 | Wywrot | G06Q 50/16 405/36 |

FOREIGN PATENT DOCUMENTS

| | | |
|---|---|---|
| CN | 106706033 A | 5/2017 |
| CN | 106812145 A | 6/2017 |
| CN | 107989151 A | 5/2018 |
| CN | 207998907 U | 10/2018 |

\* cited by examiner

REGIONAL RAINWATER ALLOCATION METHOD

CROSS REFERENCE TO THE RELATED APPLICATIONS

This application is the national phase entry of International Application No. PCT/CN2018/120937, filed on Dec. 13, 2018, which is based upon and claims priority to Chinese Patent Application No. 201810037166.9, filed on Jan. 15, 2018, the entire contents of which are incorporated herein by reference.

TECHNICAL FIELD

The present invention elates to the technical field of rainwater collection and utilization, and particularly to a regional rainwater allocation method.

BACKGROUND

Rainwater is one of the most basic, direct and economical natural resources and is an important part in hydrological circle system. Rainwater utilization is an old, traditional technology, and with the progress of human society and technological development, rainwater utilization technology has been gradually valued and made great progress. Rainwater utilization not only involves the protection and utilization of water resources, but also closely associated with drainage systems, ecological environment, etc. At present, most cities in China use rainwater pipelines to drain rainwater, which not only causes a large amount of resources flow away directly, but also the surface runoff to enter rivers, lakes and other water bodies along the urban drainage pipelines, thus aggravating pollution of urban surface water and also the contradiction between water supply and demand.

Currently, China's rainwater utilization technology is still at primary level. Rainwater utilization projects include rainwater collection and utilization facilities such as building roofs and roads, infiltration facilities and storage facilities for reducing and regulating rainwater runoff and replenishing groundwater resource, and rainwater runoff pollution control and purification facilities, etc. At present, there are few advanced rainwater collection and utilization technologies in China, and they tend to be applied in individual projects or specific projects for communities. As a result, the rainwater utilization rate in China is low, and regional large-scale and systematic use of rainwater has not yet been developed.

SUMMARY

Objects of the present invention are to provide a regional rainwater allocation method for solving the practical problems of the existing rainwater utilization technology that the rainwater utilization rate is low and that a regional large-scale and systematic use of rainwater has not yet been developed.

To achieve the above objects, the present invention provides an engineering system for collecting and utilizing regional rainwater, which comprises a rainwater collection system, a water quality treatment system, and a control and allocation system, wherein the rainwater collection system comprises a rainwater collection ditch for a hardened underlying surface, a barrier and a water storage tank; the water quality treatment system comprises a filter system; the control and allocation system comprises a water quality monitoring device, a water level monitor, a control gate and a water pump; an inlet of the filter system is connected to the underlying surface through the rainwater collection ditch, and an outlet of the filter system connected to the water storage tank; the control gate is disposed between the filter system and the water storage tank; the water quality monitoring device and the water level monitor are disposed in the water storage tank; the water pump is used to drain water from the water storage tank; and the barrier is disposed on an outer periphery of a storable and infiltratable underlying surface.

Preferably, the water quality treatment system further comprises a deposition system.

Correspondingly, the present invention further provides a regional rainwater allocation method, comprising the following steps:

Step a. selecting a region, collecting and sorting hydrometeorological and natural topographic data of the region, introducing a high-precision geographic information system (GIS) map of the region, constructing a model according to the specific conditions of the region, calculating the specific value of the height limit of water level $h_{limit}$ at a monitoring point, and the amount of rainwater storable by a rainwater storage and retention system, and constructing a basic database of the region;

Step b. supplementing and perfecting the regional rainwater collection and utilization engineering system in the region according to the hydrogeological data in the region and current condition of the engineering system for collecting and utilizing regional rainwater, combined with the characteristics of water resource in the region;

Step c. introducing rainfall data according to the weather forecast, performing analysis and calculation by means of the model, and allocating under the constraints of water level and water quality, a surface rainwater resource $Q_{total}$ to the rainwater storage and retention system and to the river, so as to obtain a preliminary allocation result of surface rainwater; and Step d. calling the model again to perform calculation according to real-time data of rainfall, water level, water quality, and soil moisture monitored during a rainfall process in the region, and maintaining the preliminary allocation result if the calculation result is consistent with the preliminary allocation result, otherwise proceeding back to Step c.

Preferably, the model comprises a rainfall model and a rainwater storage and retention model.

Preferably, the hydrometeorology includes rainfall and water system data of the region.

Preferably, the natural topographical data includes a soil infiltration coefficient, the area and percentage occupied by the underlying surfaces in the region, the type and the coverage rate of green space vegetation, the rainwater utilization ratio, and the types of a built rainwater facility and regional industrial production.

Preferably, the specific value of the amount of rainwater storable by the rainwater storage and retention system includes the amount $V_{storage}$ of rainwater storable, the amount $V_{infiltration}$ of rainwater infiltratable, the amount $V_{green}$ of rainwater storable and retainable by the green space, and the amount $V_{fire}$ of fire extinguishing water supplemented, in the region.

The present invention has the following advantages:

1. The construction of a regional rainwater allocation system enables the resource utilization of rainwater, comprehensive management of rainwater, rational planning and efficient use of a rainwater, which are important measures to alleviate water shortage. Real-time monitoring and allocation using the control and allocation system makes the use of regional rainwater resource more precise and refined, which can effectively reduce the cost of duplication and uncertainty.

2. By means of the reasonable storage and distribution of the regional rainwater resource, it is possible to delay the stormwater convergence, alleviate flood disasters, reduce the load on a regional drainage and treatment system, decrease the water pollution, maintain the urban hydrological circle, and also alleviate water and soil loss caused by surface runoff.

3. The rainwater is mainly used for greening, ecological water and fire extinguishing water, and used for replenishing the groundwater, so as to reduce water resources consumption, and can also be used for mitigating the decline of urban groundwater level. According to the needs of use, filtration-deposition and other treatments of the rainwater can effectively reduce the cost of water supply and is an important means for the development and utilization of regional water resource.

4. The present invention uses environmentally-friendly and energy-saving materials, achieves convenient installation and disassembly, reduces the use of engineering materials such as concrete and sandstone in comparison with the traditional system, can effectively reduce secondary pollution, and realizes simple construction and easy maintenance.

DETAILED DESCRIPTION

The following embodiments are intended to illustrate the present invention, but not to limit the scope of the present invention.

The following embodiments are intended to illustrate the present invention, but not to limit the scope of the present invention.

Figure 1:
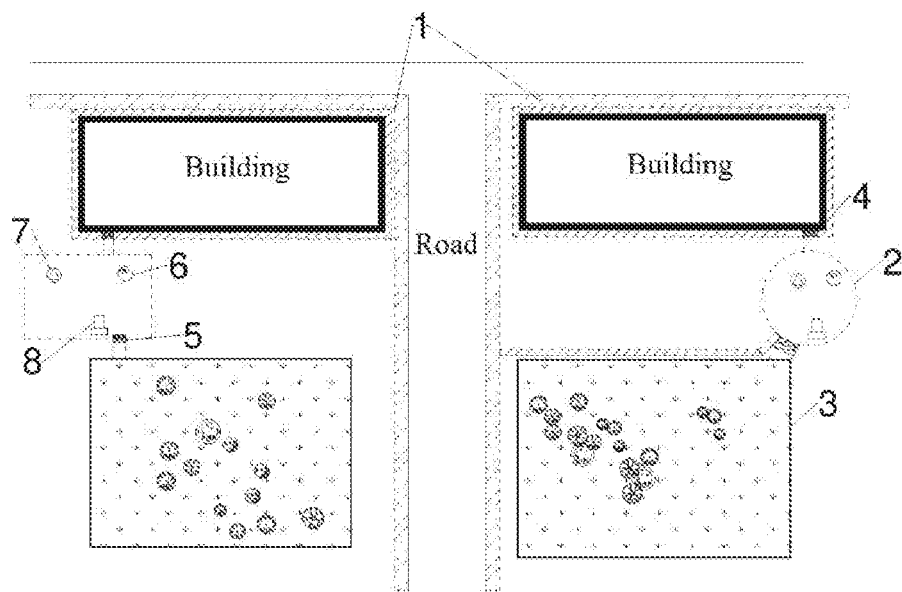
FIG. 1 is a schematic top structural view of an engineering system for collecting and utilizing regional rainwater provided by the present invention.
Figure 2:
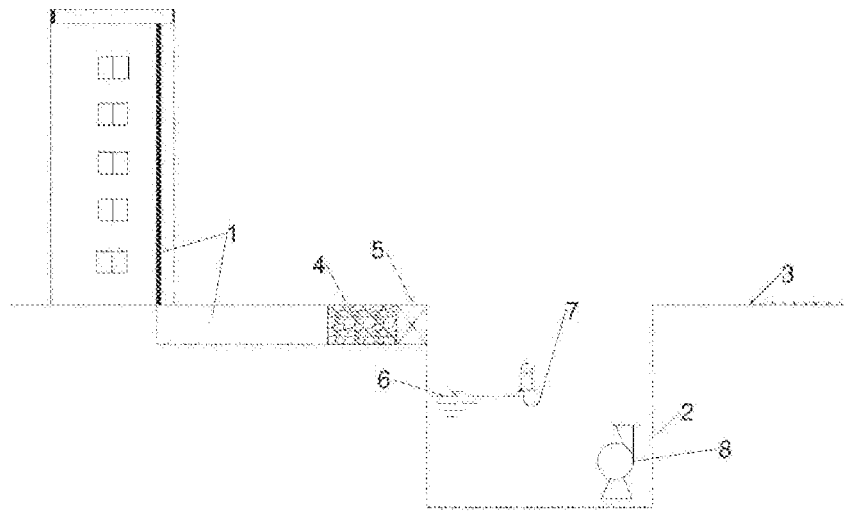
FIG. 2 is a schematic side cross-sectional structural view of the engineering system for collecting and utilizing regional rainwater provided by the present invention.

As shown in FIGS. 1 and 2, the engineering system for collecting and utilizing regional rainwater comprises a rainwater collection system, a water quality treatment system, and a control and allocation system.

The rainwater collection system comprises a rainwater collection ditch 1 for a hardened underlying surface, a barrier 3 and a water storage tank 2. The rainwater collection ditch pipe 1 is disposed along the periphery of the hardened underlying surface (a road, a square, a roof, etc.), the specific arrangement form and parameters are determined according to the regional rain intensity, catchment area and runoff system. Generally, the rainwater pipeline has a diameter DN of 100-1500 mm, and the rainwater collection system for the road, the square, etc. can collect rainwater through water drains on two sides of the road, and the cross section of the water drains is in the shape of trapezoid, cone, U-shape or rectangle. The barrier 3 is arranged around the green space or the wetland to facilitate the collection and storage of rainwater, and the material thereof is a hardened and water-tight engineering plastic, steel plate or another material having a certain strength, and the height of the barrier 3 is 50-300 mm. The water storage tank 2 is designed according to the needs of use and the situation on site, as long as it can meet the conditions of impermeability without affecting the surrounding foundation and base.

The water quality treatment system comprises a filter system 4. The filter system 4 is used for filtering the rainwater collected by the rainwater collection ditch 1 to remove impurities from the rainwater. The filter system 4 is mainly disposed at a rainwater collection port, multiple layers of filter screens with different pore sizes are used at an opening of the ditch and an inlet of the water storage tank 2 for a filtering purpose, and the minimum pore size of the filter screen is 0.43-0.28 mm, and the rainwater from which impurities have been removed enters the water storage tank 2 under the control of the control gate 5. Further, the water quality treatment system further comprises a deposition system, the deposition is mainly performed in the water storage tank 2, and the water storage tank 2 is periodically cleaned as needed.

The control and allocation system comprises a water quality monitoring device 7, a water level monitor 6, a control gate 5 and a water pump 8. The water quality monitoring device 7 is disposed in the water storage tank 2 for monitoring the water quality of the rainwater in the water storage tank 2. The water level monitor 6 is used to monitor the water level in the water storage tank 2 in real time. The control and allocation system rationally allocates, under the constraints of water level and water quality, the surface rainwater resource), total to the rainwater storage and retention system and to the river according to the requirements of regional allocation, for the specific allocation method, which will not be described in detail here, see Table 1 below.

Figure 3:
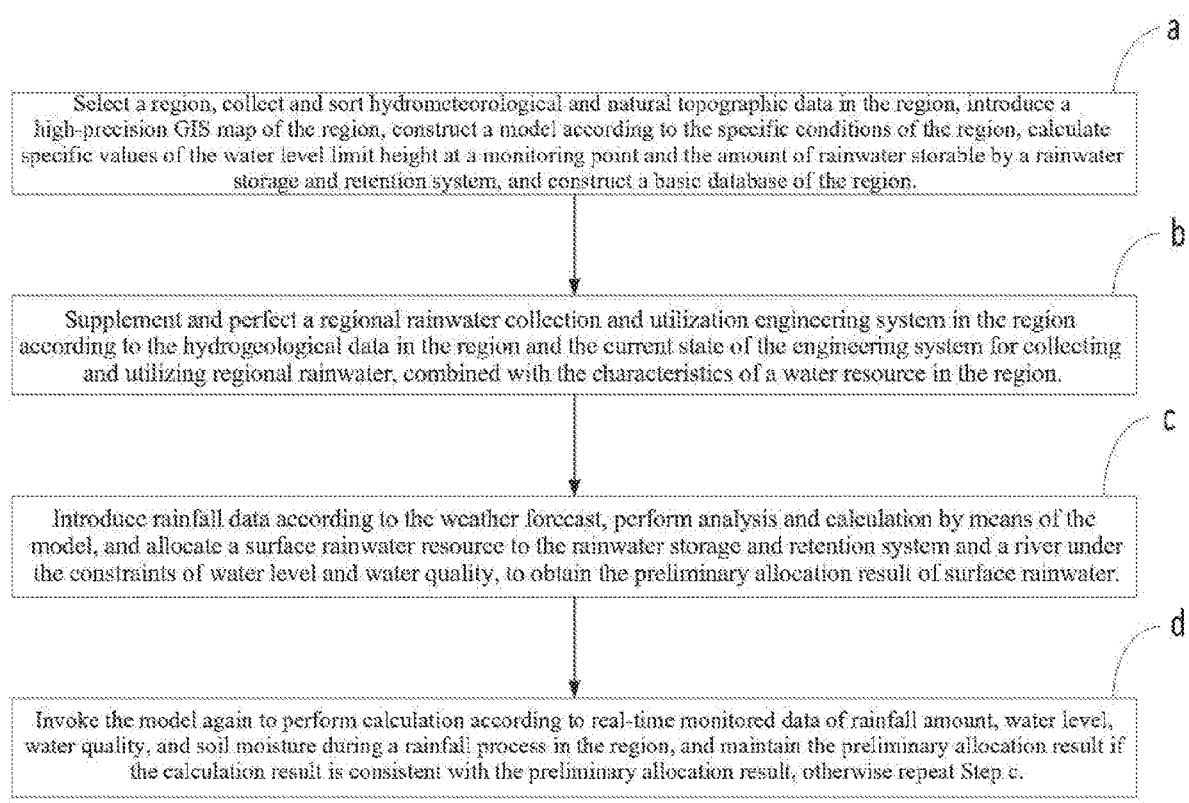
FIG. 3 is a flow chart of a regional rainwater allocation method provided by the present invention.

Correspondingly, the present invention further provides a regional rainwater allocation method, as shown in FIG. 3. The regional rainwater allocation method comprises the following steps:

Step a. selecting a region, collecting and sorting hydrometeorological and natural topographic data of the region, introducing a high-resolution GIS map of the region, constructing a model according to the specific conditions of the region, calculating the specific value of the height limit of water level $h_{limit}$ at a monitoring point and the amount of rainwater storable by a rainwater storage and retention system, and constructing a basic database of the region.

After the region is selected, it is first necessary to collect and sort hydrometeorological and natural topographic data in the region. The hydrometeorology includes rainfall and water system data of the region. The natural topographic data includes a soil infiltration coefficient, the area and percentage occupied by the underlying surfaces (a building roof, a road, a square, a green space, etc. in the region, the type and the coverage rate of green space vegetation, the rainwater utilization ratio, and the types of a built rainwater facility and regional industrial production. The high-precision GIS map uses the highest possible resolution and is updated in a timely manner. The $h_{limit}$ is the height limit of water level at the monitoring point.

The model includes a rainfall model and a rainwater storage and retention model. In the rainfall model, $Q_{total}=Q_{roof}+Q_{road}+Q_{square}+Q_{green}$, where $Q_{total}$ is the total surface rainwater amount generated by rainfall in the region $Q_{roof}$, $Q_{road}$, $Q_{square}$ and $Q_{green}$ are respectively the rainwater amount of the rain fallen to the roof of all buildings, the road, the square and the green space in the region, and the rainfall in the model is calculated by the formula $Q=\alpha*s*h$, where Q is the surface rainwater amount generated by rainfall, s is the calculated area of rainfall in the region, α is a runoff coefficient corresponding to the calculated area, and h is the rainfall. In the rainwater storage and retention model, $V=V_{green}+V_{infiltration}+V_{fire}+V_{storage}$, where V is the total amount of rainwater storable and retainable in the region, $V_{green}$ is the amount of rainwater storable and retainable in the green space of the region, $V_{infiltration}$ is the amount of rainwater infiltratable in the region, $V_{fire}$ is the amount of fire extinguishing water supplemented in the region, and $V_{storage}$ is the amount of rainwater storable in the region. The allocation system intelligently allocates the rainwater Q in the region according to the constraints of water quality, time, distance and degree of importance. In the normal case, when the water quality meets the requirements, the order of supply is $V_{storage}$, $V_{fire}$, $V_{green}$, and $V_{infiltration}$, and the allocation can be implemented according to Table 1 for different situations in different regions. After the model is established, the specific value of the height limit of water level $h_{limit}$ at the monitoring point and the amount of rainwater storable by the rainwater storage and retention system are calculated, i.e., $V_{storage}$, $V_{fire}$, $V_{green}$, $V_{infiltration}$. The basic database of the region is mainly composed of basic data of the GIS map, meteorology, topography, underlying surfaces, and water system and ditches of the region.

The allocation of the surface rainwater resource to the rainwater storage and retention system and to the river under the constraints of water level and water quality can be performed in accordance with Table 1. Since the preliminary allocation result may not be the optimal allocation result, it is also necessary to perform Step d to correct the preliminary allocation result.

Step d. calling the model again to perform calculation according to real-time data of rainfall, water level, water quality, and soil moisture monitored during a rainfall process in the region, and maintaining the preliminary allocation result if the calculation result is consistent with the preliminary allocation result, otherwise proceeding back to Step c.

The preliminary allocation result is corrected by Step d to obtain the optimal allocation result. Finally, the remote control gate 5 and the water pump 8 are used to transport the regional surface rainwater to the water storage tank 2, the green space, etc. to achieve the full utilization of the regional rainwater.

Although the present invention has been described in detail with the general description and particular embodiments above, on the basis of the present invention, some modifications or improvements can be made thereto, which would have been obvious to those skilled in the art. There-

TABLE 1

Rainwater resource allocation

| Monitored water body | Water quality | Water level | Destination | Measures and Applicable range |
|---|---|---|---|---|
| $Q_{total}$ amount of rainwater collectable in a region | q belongs to worse than Class V | h | Sewage treatment plant | Enter a sewage pipe network in the region, mainly used in the early stage of rainfall, chemical parks with potential pollution, etc. |
| | q belongs to Class IV, Class V | $h < h_{limit}$# | $V_{green}$, $V_{infiltration}$# | Drain the rainwater into the green space or infiltrate same to supplement the groundwater by means of a water pump# |
| | | $h \geq h_{limit}$ or $Q \geq V_{fire}$# | $V_{green}$, $V_{infiltration}$, watercourse | Drain the rainwater into the green space or infiltrate same to supplement the groundwater by means of the water pump |
| | q belongs to Class III | $h < h_{limit}$ and $Q < V_{fire}$# | $V_{fire}$ | Introduce the rainwater into a fire extinguishing water pool by the water pump# |
| | | $h \geq h_{limit}$ or $Q \geq V_{fire}$# | $V_{fire}$, $V_{green}$, $V_{infiltration}$, watercourse# | Drain the rainwater into the fire extinguishing water pool, the green space, infiltration and watercourse by means of the water pump |
| | Q is higher than Class II | $h < h_{limit}$ and $Q < V_{storage}$# | $V_{storage}$ | Introduce the rainwater into a water storage tank by means of the water pump to supplement a water source# |
| | | $h \geq h_{limit}$ or $Q \geq V_{storage}$# | $V_{storage}$, $V_{fire}$, V, $V_{infiltration}$, watercourse# | Drain the rainwater into the water storage tank, the fire extinguishing water pool, the green space, infiltration and watercourse by means of the water pump# |

Notes:
1. q in the table is the real-time water quality of the collected rainwater monitored after treatment by the system; 2. h is the real-time water level heights monitored at different points of rainwater collection, which is the height limit of water level at the monitoring point; and 3. in the water-scarce region, during the designing of the system, according to local conditions, water storage tanks and fire pools and water treatment equipment are provided as much as possible, to ensure the full utilization of the rainwater.
Step b. supplementing and perfecting the regional rainwater collection and utilization engineering system in the region according to the hydrogeological data in the region and the current condition of the engineering system for collecting and utilizing regional rainwater, combined with the characteristics of water resource in the region.
The engineering system for collecting and utilizing regional rainwater comprises the rainwater collection system, the water quality treatment system and the control and allocation system as described above, and the above systems are regularly inspected to ensure that the pipelines and ditches are unimpeded and the equipment operates normally.
Step c. introducing rainfall data according to the weather forecast, performing analysis and calculation by means of the model, and allocating, under the constraints of water level and water quality, a surface rainwater resource to the rainwater storage and retention system and to the river, so as to obtain a preliminary allocation result of surface rainwater.

What is claimed is:

1. A regional rainwater allocation method, comprising the following steps:

step a, selecting a region, collecting and sorting hydrometeorological data and natural topographic data of the region, introducing a high-precision GIS map of the region, constructing a model according to conditions of the region, calculating a value of a height limit $h_{limit}$ of a water level at a monitoring point and a value of an amount of rainwater stored by a rainwater storage and retention system, and constructing a basic database of the region;

step b, supplementing and perfecting an engineering system for collecting and utilizing regional rainwater in the region according to the hydrometeorological data in the region and a current condition of the engineering system for collecting and utilizing the regional rainwater in combination with characteristics of a water resource in the region;

step c, introducing rainfall data according to a weather forecast, performing an analysis and a first calculation by means of the model, and allocating, under constraints of the water level and water quality, a surface rainwater resource $Q_{total}$ to the rainwater storage and retention system and a river, to obtain a preliminary allocation result of surface rainwater; and step d, calling the model again to perform a second calculation according to real-time data of rainfall, the water level, the water quality, and soil moisture monitored during a rainfall process in the region to obtain a calculation result, and maintaining the preliminary allocation result if the calculation result is identical to the preliminary allocation result, if the calculation result is not identical to the preliminary allocation result, returning to step c.

2. The regional rainwater allocation method according to claim 1, wherein the model comprises a rainfall model and a rainwater storage and retention model.

3. The regional rainwater allocation method according to claim 1, wherein the hydrometeorological data comprises rainfall and water system data of the region.

4. The regional rainwater allocation method according to claim 1, wherein the natural topographic data comprises a soil infiltration coefficient, an area and a percentage occupied by an underlying surface in the region, a type and a coverage rate of green space vegetation, a rainwater utilization ratio, and types of a built rainwater facility and regional industrial production.

5. The regional rainwater allocation method according to claim 1, wherein the value of the amount of the rainwater stored by the rainwater storage and retention system comprises an amount $V_{storage}$ of rainwater stored in the region, an amount $V_{infiltration}$ of rainwater infiltrated in the region, an amount $V_{green}$ of rainwater stored and retained by a green space in the region, and an amount $V_{fire}$ of fire extinguishing water supplemented in the region.

* * * * *